Dec. 29, 1953 M. UNTERMAN 2,664,105
CONTROL VALVE FOR HYDRAULIC SYSTEMS
Filed Aug. 30, 1948 3 Sheets-Sheet 1

INVENTOR.
Manuel Unterman
BY
Charles S. Wilson
ATTORNEY.

Dec. 29, 1953 M. UNTERMAN 2,664,105
CONTROL VALVE FOR HYDRAULIC SYSTEMS
Filed Aug. 30, 1948 3 Sheets-Sheet 2
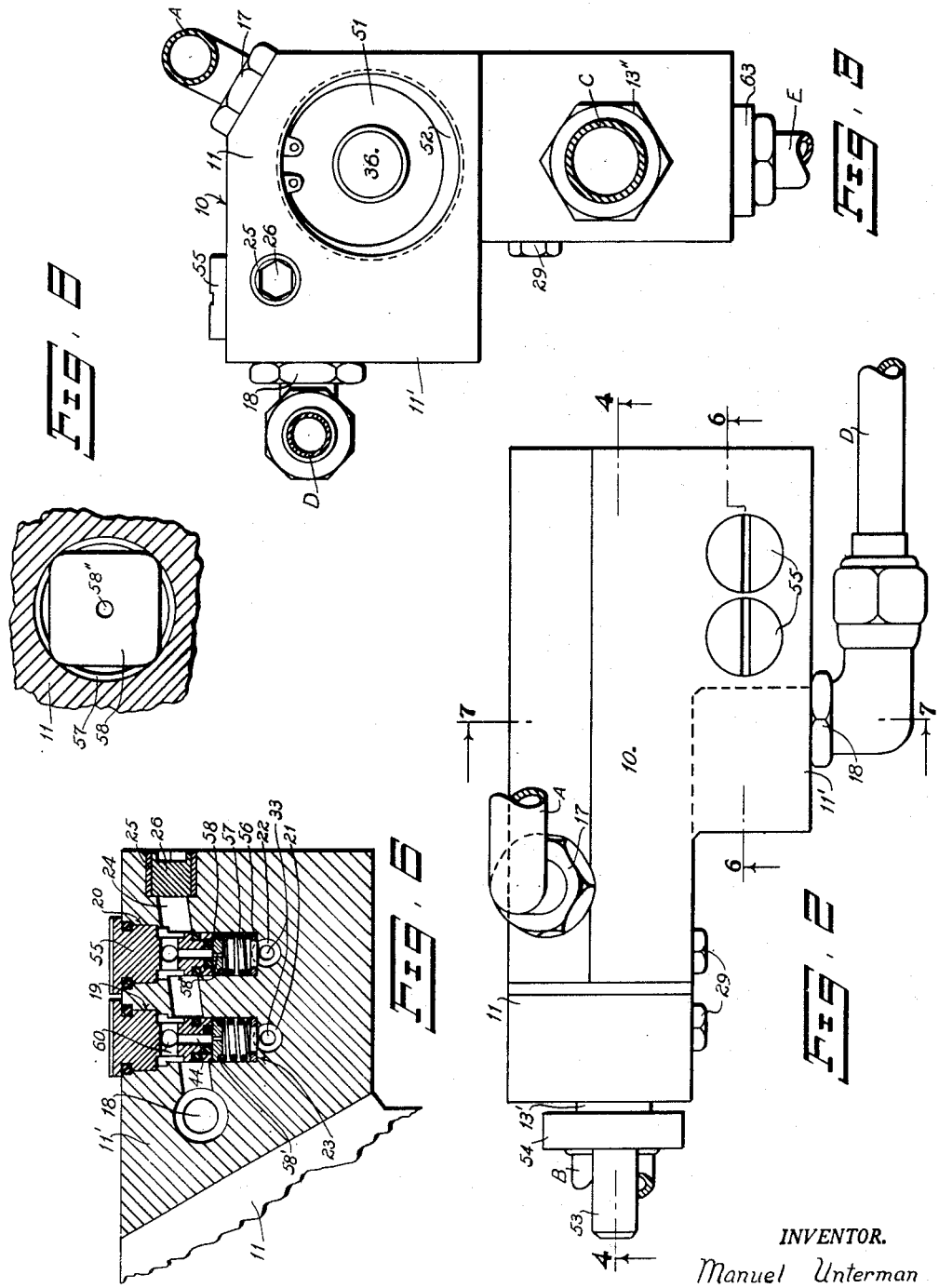
INVENTOR.
Manuel Unterman
BY
Charles S. Wilson
ATTORNEY.

Dec. 29, 1953 M. UNTERMAN 2,664,105
CONTROL VALVE FOR HYDRAULIC SYSTEMS
Filed Aug. 30, 1948 3 Sheets-Sheet 3
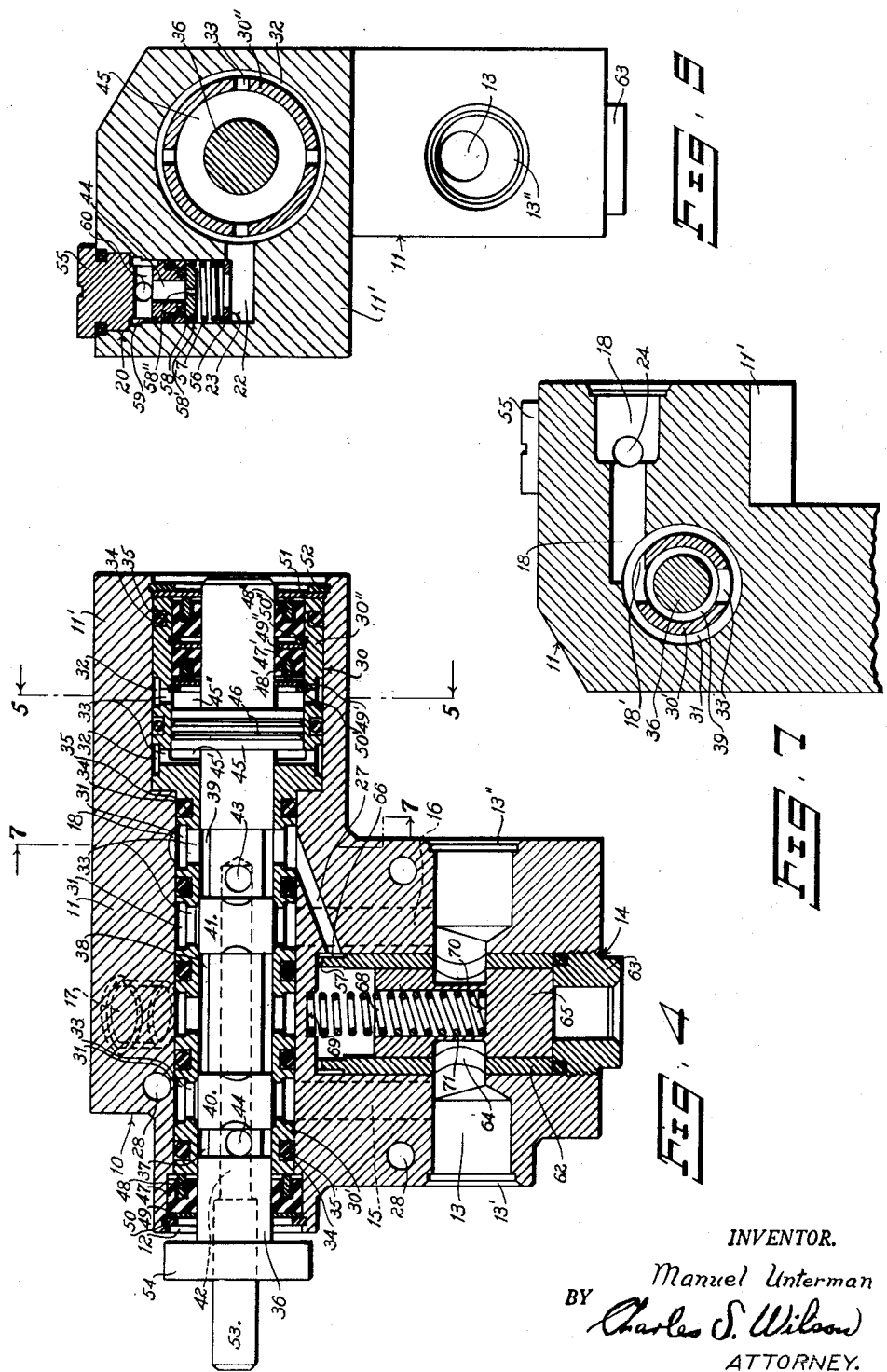
INVENTOR.
Manuel Unterman
BY Charles S. Wilson
ATTORNEY.

Patented Dec. 29, 1953

2,664,105

UNITED STATES PATENT OFFICE 2,664,105

CONTROL VALVE FOR HYDRAULIC SYSTEMS

Manuel Unterman, Far Rockaway, N. Y., assignor to Republic Aviation Corporation, near Farmingdale, N. Y., a corporation of Delaware Application August 30, 1948, Serial No. 46,897

6 Claims. (Cl. 137—622)

This invention relates to valve assemblies for controlling and directing the flow of fluid in hydraulic systems.

Among its other objects the present assembly proposes a valve for the direct control of the flow of fluid to the several sections or parts of a hydraulic system which will be especially sensitive in its operative response to adjustment and will materially reduce the adjusting movement required to properly direct the fluid flow through the system and/or through any section thereof.

Since it has been found that flutter or vibration may develop in a valve such as that herein contemplated, the instant invention proposes a damper in association with the valve which will counteract vibrations of the valve and its parts and overcome any tendency thereof to develop an amplified stroke or irregular movement.

On occasion, as for example where the valve is employed to selectively direct fluid to the ends of a hydraulic jack, it becomes desirable, if not essential, to manually supply the power normally produced by the jack in which event the resistance to manual operation, viz., the load normally moved by the jack, the jack and the fluid of the entire system should be reduced to a minimum. To that end the present assembly embodies a direct or auxiliary connection between the opposite ends of the cylinder of the jack, automatically made effective if and when pressure from the fluid source is radically reduced or is entirely removed from the system, and thereby delivers the hydraulic fluid from one side of the piston of the jack to the other and vice versa without the extensive travel through the system that otherwise would be necessary.

With the above and other objects in view, as will be apparent, this invention consists in the construction, combination and arrangement of parts all as hereinafter more fully described, claimed and illustrated in the accompanying drawings, wherein:

Fig. 2 is a top elevation of the assembly as shown in Fig. 1;

Fig. 3 is an end elevation of the assembly taken from the right in Fig. 1;

Fig. 4 is a longitudinal section taken along line 4—4 of Fig. 2 through the valve without showing the various lines or pipes;

Fig. 5 is a transverse section along line 5—5 of Figs. 1 and 4;

Fig. 6 is a longitudinal section taken along line 6—6 of Fig. 2 to illustrate the fluid supply for the damper;

Figure 1:
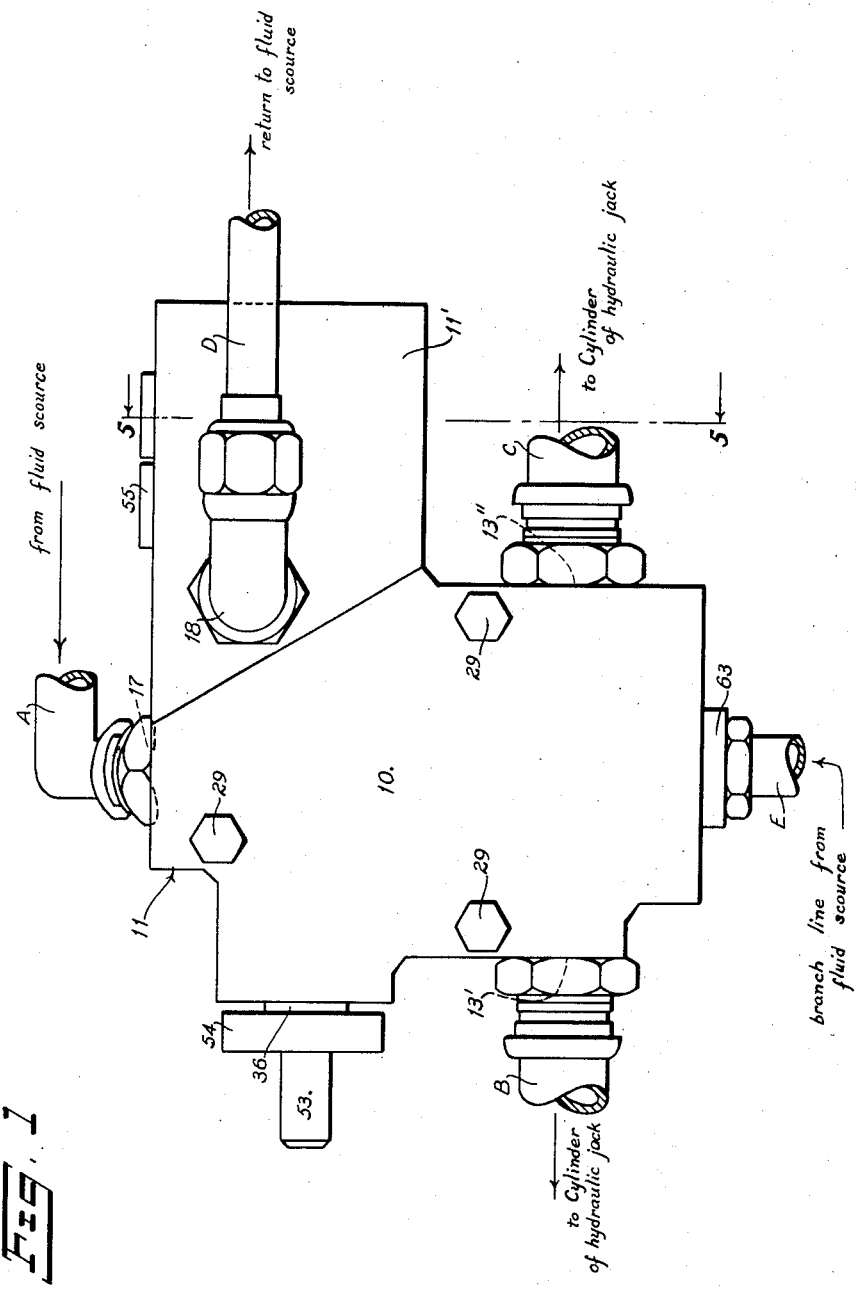
Fig. 1 is an outside elevation of a control unit or valve assembly constructed in conformance with the teachings of the present invention and shows an actuating means for the valve and the various pipes and conduits under the control of or associated with the valve.

Fig. 7 is a fragmentary transverse section taken along line 7—7 of Figs. 2 and 4 to illustrate the relation between the valve and the return to the source of fluid; and Fig. 8 is a fragmentary section taken through that portion of the control unit assembly illustrated in Fig. 6 to show the relationship between the rectangular plate and its associated cavity in the casing of said control unit assembly.

While the present valve assembly is adapted for use wherever it is desired to control the flow of hydraulic fluid, it is especially designed for use in conjunction with the power source or mechanism employed for the adjustment of the ailerons or other movable control surfaces of high speed aircraft where, because of the speed attained, and the aerodynamic forces set up thereby, it has been found to be necessary to adjust the movable control surfaces mechanically or by the application of power greatly in excess of the maximum a pilot is capable of manually producing. Actually the instant valve initiates and governs the operation of a power unit or hydraulic jack which primarily moves or angularly displaces the attached movable control surfaces of the aircraft to the end that the pilot normally is relieved of any direct manipulation or adjustment of the control surfaces. In short, under normal operating conditions, the pilot merely sets or regulates the present valve assembly whereupon the associated control surfaces are adjusted by the connected and controlled motor or jack. Consequently, this indirect control which the pilot exercises on the control surfaces, and hence over the maneuverability of the aircraft, is a departure from the heretofore, conventional, direct control and requires an instantaneous setting of the valve with limited amplitude of movement by its parts to insure ready response of the control surfaces.

A disadvantage of an indirect control, such as here contemplated, would be occasioned by the absence of resistance to movement by the control surfaces, or "feel back," through which the pilot is normally and continuously aware of this resistance to adjustment when directly and manually adjusting the control surfaces. Therefore, while the pilot only regulates or sets the instant valve to adjust the control surfaces, means is incorporated in the system with which the valve is associated to establish "feel back" or a sense of resistance to movement in the pilot's control lever or stick and thereby simulate conditions of direct, manual operation and adjustment of the control surfaces.

Features of the indirect control system with which the present valve assembly is particularly designed to cooperate are described and claimed in copending application Serial No. 51,548 filed September 28, 1948, in the name of Milton C. Bergey to which reference is here made for a more thorough and detailed understanding of such system and its components. The instant valve while being especially adapted for use in this particular system can be employed anywhere for the control of a hydraulic jack or system.

Suffice it to say that the present valve is particularly sensitive and requires a minimum adjustment by the conventional type control lever or stick under the hand of the pilot to initiate the operation of the controlled jack or motor and thereby adjust the control surfaces.

Since the valve must be, in effect, connected directly with the pilot's control lever, it is to some extent exposed to substantially the same forces and vibrations as the control surfaces being regulated and adjusted by the power unit. In other words, since a power unit designed to operate the control surfaces requires an extremely sensitive control valve for its efficient operation, and since this control valve, is at least indirectly, associated with the control surfaces or parts thereof and therefore may be subject to excessive vibration and flutter, this invention is directed toward the design of a sensitive valve which embodies a damper to counteract or quell any tendency of the components of the valve to unduly vibrate or flutter.

The present invention proposes a unitary control valve assembly embodying three coordinated and interdependent features viz; a sensitive control valve, a unit for dampening vibrations within the valve and a secondary valve for disconnecting the valve assembly from the hydraulic system to permit direct manual adjustment of the control surfaces. This control valve assembly serves to selectively direct hydraulic fluid to the ends of the cylinder of a hydraulic jack by the pilot through and by means of the conventional control lever or stick in association with a suitable linkage.

The dampener element serves to absorb or dampen out flutter, chattering and/or vibration such as that induced by the outside air loads to which the control surfaces of the aircraft are exposed, and which might otherwise impede or prevent the precise operation of the valve and consequently the control of the aircraft by the pilot.

The by-pass element serves to permit an equalized or ineffective flow of hydraulic fluid from one end of the cylinder of the hydraulic jack to the other in case of hydraulic system failure, or if for any reason the pilot prefers to eliminate the use of the power unit to adjust the control surfaces.

In the accompanying drawings 10 refers generally to a control unit or valve assembly to govern or direct the operation of an associated hydraulic power unit or jack, customarily in the form of a cylinder and piston (not shown). The housing or body 11 of this control unit 10 is illustrated in its preferred form, as a single forging whose irregular, external shape more or less defines a pattern consistent with the internal fluid passages and ducts, as well as the bores or cavities in which the mechanisms of the assembly are accommodated, as will be described.

The housing 11 preferably comprises a unitary casting or forging, but it may, if desired, consist of a number of parts or sections assembled and secured together into a complete unit. Regardless of the manner in which the housing is produced it contains and defines a number of bores, passages and ducts by and through which the flow of the fluid of the system is directed or controlled. Thus, as will be seen, the housing contains a main bore in which the control valve per se is mounted for reciprocation; an aligned extension of the main bore in which is situated the damper for counteracting vibration or flutter on the part of the valve; and an auxiliary bore arranged normal to the axis of the main bore to house a cut-off valve by which the fluid is prevented from passing directly between the ends of the cylinder of the power unit or hydraulic jack when the control surfaces are adjusted by the application of power.

Internally of and extending longitudinally through the casing or housing 11 are a pair of longitudinal bores viz: a main bore 12 and a by-pass bore 13, which lie parallel one with the other and in the same vertical plane. The respective diameter of these bores 12 and 13, however, are not of uniform or consistent size throughout their lengths, varying appreciably for functional reasons and in order to coincide and cooperate with interal mechanism of the valve.

Normally, the by-pass bore 13 is sealed medially of its length by a movable cut-off valve, the structure and operation of which will be later described. In the meantime, therefore, reference will be made to the opposed ends of this bore which comprise ports 13' and 13" respectively, communicating with the opposite ends of the power unit or hydraulic jack.

An auxiliary bore 14, coplanar with the bores 12 and 13, extends from the bottom face of the housing 11 to intersect the bypass bore 13 and terminate adjacent to the main bore 12 with which it has no connection. A pair of identical ducts 15 and 16, which on occasion independently connect the longitudinal bore 12 with the ends of the bore 13, i. e. the ports 13' and 13" are located one on either side of and parallel with but in a different plane than the auxiliary bore 14. An inlet port 17 is disposed in vertical alignment with the auxiliary bore 14 and extends angularly through the upper wall of the housing 11 to connect with the main bore 12, as shown by dotted lines in Fig. 4. These ports 13' and 13" are in effect operating ports for as will be seen one will deliver fluid to one end of the jack cylinder while the other comprises a return connected with the other end of the cylinder and vice versa. Thus the flow of fluid through these ports directly causes the operation of the jack.

One end of the housing 11 is enlarged as at 11' to project laterally from the main body thereof and defines a number of similar passages, one of which the fluid return 18 passes through the enlargement from an outer face thereof to the main bore 12 (see Fig. 7). While this fluid return passage 18 is normal to the axis of the main bore 12, its center or axis lies in a plane somewhat above that of the main bore so that only a part 18' of the inner extremity of this passage 18 communicates with the main bore 12, and the terminal or inner end wall of the passage 18 is located directly over the longitudinal center or axis of the main bore 12.

Also a pair of equivalent, vertical cavities 19 and 20 are created in the enlargement 11' adjoining but separated from the passage 18 and extend from a surface of the housing 11 to a point short of the center or axis of the main bore 12, which is adjacent to and to one side of the inner extremities or bottoms of the cavities 19 and 20 (see Fig. 5). Two companion ducts 21 and 22 connect the bottoms of the respective vertical cavities 19 and 20 with the main bore 12, said companion ducts being of appreciably smaller diameter than the vertical cavities 19 and 20 so as to form shoulders 23 in the body of the housing 11 where each of the cavities 19 and 20 respectively intersect its coacting duct above the axes of the ducts 21 and 22 and of the main bore 12 (see Figs. 5 and 6). It is to be noted that the ducts 21 and 22 communicate with or intersect the main bore 12 in substantial alignment with its axis.

The enlargement 11' of the housing 11 is also provided with a sloping conduit 24 extending inwardly and downwardly from an outer surface of the enlargement to intersect both cavities 19 and 20 and connect or feed into the fluid return passage 18. The outer end of the sloping conduit 24 is enlarged to receive an internally threaded bushing 25. A screw cap or plug 26 is threaded into the bushing 25 to seal the outer end of the conduit 24 (see Fig. 6).

Extending from and communicating with the main bore 12 and sloping angularly therefrom is a relatively small duct 27. This duct 27 extends between the bottom of the main bore 12, below the fluid return passage 18, and terminates at and in communication with the inner end of the auxiliary bore 14 to establish communication between the bores 12 and 14. It will be observed (Fig. 4) that the duct 27 lies in a plane forward of the duct 16 and is therefore completely isolated therefrom.

The housing 11, as above described, constitutes the shell or casing of the valve assembly 10. It is, moreover, provided with a number of similar apertures 28 which traverse the solid portions of the housing 11 so as not to obstruct and interfere with the internal passages, ducts or conduits thereof. These apertures 28 provide for the passage of the bolts 29 by which the entire valve assembly 10 is secured to or mounted on its associated power mechanism or on an intermediate structure.

A cylindrical bushing 30, designed for snug, stationary engagement within the main bore 12 is installed or inserted therein to be substantially coextensive therewith. This bushing 30 consists of a hollow or tubular member characterized by a reduced and longer portion 30' and a shorter, enlarged head or end portion 30'' of substantially greater diameter than the portion 30', said head or end portion in its final or assembled position being accommodated in that part of bore 12 within the enlargement 11' of the housing 11. The overall length of the bushing 30 can be somewhat less than that of the main bore 12 and in its final or assembled position the bushing 30 lies completely and sufficiently within the outer limits or contour of the housing 11 to permit securing means to be inserted in the ends of said bore 12 as will be described.

The portion 30' of the bushing 30 having the smaller diameter is provided with four annular or peripheral grooves 31 in its outer surface. A pair of similar, although comparatively smaller grooves 32 are formed in the outer surface of and circumscribe the head or larger portion 30'' of the bushing. Each of the grooves 31 and 32 is positioned so as to align, when the final assembly of the bushing 30 within the valve assembly 10 is completed, with one of the various ducts, conduits and passages in the housing 11 which intersect or communicate with the main bore 12 to wit; the ducts 15 and 16, inlet port 17, fluid return passage 18, ducts 21 and 22 and duct 27.

Each of the grooves 31 and 32 have one or more openings 33 piercing their bottoms and terminating in communication with the interior of the bushing 30. Thus the alignment of a groove 31 or 32 with one of the ducts, conduits, passages, etc., aforesaid establishes a free passage from the latter to the interior of the bushing 30.

Another and different series of annular grooves 34 are provided along the periphery of the bushing 30 to receive and secure therein the packing glands or sealing O-rings 35, one of which is needed on either side of each of the above described grooves 31 and 32 to prevent leakage from grooves longitudinally of the bushing 30.

A valve consisting of a cylindrical rod 36 having an external diameter to fit closely within the hollow reduced portion 30' of the bushing 30 is mounted for limited reciprocation with such reduced portion. However, the central portion of this rod 36 is provided with three circumferential grooves created by reducing the diameter of the rod at selected points thereby establishing shoulders at the sides of said grooves. These grooves in combination with the flanking shoulders and the wall of the bushing 30 create three separate chambers 37, 38 and 39 within the bushing 30 and surrounding or circumscribing the valve or rod 36.

The creation of the chambers 37, 38 and 39 in the outer face of the valve 36 leaves those portions of the valve disposed between and separating the chambers as bearings or seats to reciprocate in flush contact with the inner surface of the wall of the bushing 30. This arrangement manifestly results in a pair of closures or valves 40 and 41 situated in spaced relation on the central portion of the rod 36, the closure 40 being flanked by the chambers 37 and 38 while the closure 41 is positioned between the chambers 38 and 39.

During the reciprocation of the valve 36 the closures 40 and 41 respectively move over the openings 33 communicating with the grooves 31 in the exterior surface of the bushing 30. Thus when the valve 36 is moved to the left from the position shown in Fig. 4 the closure 40 clears the openings 33 and grooves 31 in alignment with the duct 15 and brings the central chamber 38 of the valve into communication with said duct and at the same time the other closure 41 clears the groove 31 and opening 33 in alignment with the duct 16 and brings the chamber 39 into communication with this duct. The reverse movement of the valve 36 in the same manner establishes communication between the duct 15 and the chamber 37 and between the central chamber 38 and the duct 16. The position of the valve 36 illustrated in Fig. 4 can be said to be its neutral position whereby there is and can be no flow of hydraulic fluid through the valve assembly and the ducts 15 and 16 are respectively sealed by the closures 40 and 41.

The valve 36 is hollow having a longitudinal concentric passage 42 therein which extends from one end of the valve 36 to a point adjacent the chamber 39 and in this manner the passage 42 underlies the chambers 37 and 38, part of the chamber 39 and the closures 40 and 41. A transverse hole 43 pierces the rod 36 at substantially the inner extremity of the passage 42 to establish communication between the passage 42 and the chamber 39. A similar hole 44 is provided in the valve or rod 36 adjacent the chamber 37 to establish communication between that chamber and the passage 42. Hence both chambers 37 and 39 are always in communication with the passage 42 of the valve 36 and therefore are always connected one with the other by and through the passage 42.

One extremity of the valve or rod 36, or the end portion thereof projecting into the enlargement 11' of the housing 11, is provided with a piston 45 fixedly secured thereto and having an outer diameter to sealingly contact the internal surface of the head 30" of the bushing 30 located within said enlargement. When the valve 36 is in its neutral position as shown in Fig. 4, the piston 45 will be located within the enlarged head portion of the bushing 30 between the peripheral grooves 32 thereof to constitute a wall or partition between the holes 33 in said grooves and thereby prevent any communication between these holes or openings and between the grooves 32. Two chambers 45' and 45" are thereby created within the hollow, head portion 30" of the bushing 30, one on either side of the piston 45. The piston 45 is provided with a pair of peripheral V-grooves 46 which not only reduce, as much as possible, friction developing between the piston 45 and the contacting inner surface of the bushing 30 but also reduce leakage between chambers 45' and 45" by creating turbulence in fluid at said grooves.

The valve 36 is held in place by retaining means employed at both ends thereof within the extremities of the fixed tubular or hollow bushing 30 and these retaining means also serve as packing glands to prevent fluid leakage at the ends of the main bore 12. To this end the retaining means or packing gland at one end of the main bore 12 comprises a resilient U-seal 47, a ring spacer 48, a washer 49 and a snap-ring 50. The U-seal 47 encircles the end of the valve 36 and sealingly engages the wall of the main bore 12 and the ring spacer 48 is seated between the arms of the U-seal and abuts the adjacent extremity of the bushing 30. As shown in Fig. 4 the washer 49 overlies the outer face or base of the seal 47 and the whole assembly is locked against movement by the snap-ring 50 engaging in a groove in the wall of the main bore 12. When thus assembled the retaining member and seal effectively closes and seals one end of the main bore 12 around the projecting end portion of the valve 36 and also provides a seal that prevents appreciable leakage between the end of the bushing 30 and the wall of the main bore 12.

A similar arrangement closes the opposite end of the main bore 12 situated in the enlargement 11' of the housing 11. However, at this end of the bore 12 a pair of seals or glands are employed, each, of which is for all practical purposes, a duplicate of the other and identical with the single seal above described. This double seal or gland is assembled within the head portion 30" of the bushing 30, the U-seals 47' thereof facing in opposite directions as illustrated in Fig. 4. A snap-ring 50' is engaged in a groove in the wall of the bushing 30 at the inner end of the double seal and holds an adjacent washer 49' in place. The ring spacer 48' carried between the arms of the inner seal 47' abuts this washer 49' and is held immovable by a second washer 49" and snap-ring 50" operating against the opposite or outer face of the inner seal. The base of the second or outer seal bears against the snap-ring 50" and the ring spacer 48" carried between its arms abuts a washer 51 held in the extreme outer end portion of the main bore 12 by a snap-ring 52. It is to be noted that while the double seal is located in the head portion 30" of the bushing 30 it is held there by the washer 51 abutting the extremity of the bushing and the snap-ring 52 engaged in a groove in the wall of the main bore 12. This arrangement not only seals the end of the bushing 30 against leaks around the cooperating end portion of the valve 36 but prevents any outward longitudinal movement of the bushing 30 at that end of the main bore 12. This double seal, among its other purposes, is to make it doubly assured that there will be no air infiltration into the chamber 45" which, if it occurred, would reduce the efficiency of the damper.

A valve rod 53 is threaded or otherwise secured in the outer end of the passage 42 of the valve 36 whereby it becomes, in effect, an integral part of the valve and closes the extreme outer end of the passage 42. It is to the terminal of this valve rod 53 that the pilot's control lever, or other actuating means is attached whereby the valve 36 may be reciprocated within the bushing 30 and actuated in either direction. This rod 53 is provided with a boss or nut 54 which is adjustably secured thereon, for example by a lock pin or its equivalent.

In view of the foregoing, it will be readily seen that hydraulic fluid under pressure from a suitable source is delivered through a pipe A to the supply port 17, where it will be fed directly to and confined in the central chamber 38 of valve 36 until the latter reciprocated out of its neutral position shown in Fig. 4. Through the direction of motion imparted to the valve 36, the pilot can direct or control the operation of the associated or controlled hydraulic jack in either direction. In other words, reciprocation of the valve 36 in either direction displaces the closures 40 and 41 partially or entirely from their neutral position (Fig. 4) overlying the holes 33 in the bushing 30 in alignment with the ducts 15 and 16 thereby establishing communication between the chamber 38 and one or the other of the ducts 15 or 16. The hydraulic fluid under pressure will then be free to flow from the chamber 38 through either the duct 15 or the duct 16 to one or the other of the ports 13' or 13". As the ports 13' and 13" are connected by suitable pipes B and C to opposed ends of the cylinder of the hydraulic jack (not shown) the fluid under pressure from one of these ports will force the piston of the jack to expel fluid from the opposite end of the cylinder for transmission to the other of said ports. Thus if the duct 15 and port 13' are connected to deliver fluid from the chamber 38 to one end of the cylinder of the jack the opposite end of the cylinder delivers fluid to the port 13" and duct 16 for return to the source of fluid under pressure and vice versa. Hence, should the hydraulic fluid be free to flow from the chamber 38 around the closure 40, through the duct 15 and out the port 13' to one end of cylinder, the fluid already in the opposite end of the cylinder is forced to return to the valve assembly through the port 13'', the duct 16, the chamber 39, access to which is then around the closure 41 and out through the return passage 18, pipe D and back to the source of fluid under pressure. The opposite operation of the valve 36 produces a reverse flow of the fluid in that the return from the cylinder is through the port 13' and duct 15 to the chamber 37 from which the fluid is delivered to the passage 42 in the valve 36 by way of the hole 44. From the passage 42 of the valve 36 the fluid is discharged through the hole 43 into the chamber 39 where it is released to the return passage 18.

Since this valve assembly 10 when used in conjunction with the power unit of an aileron control system, for which it is primarily designed, necessarily becomes part of said power unit or hydraulic jack and said aileron control system, it is, in effect, directly connected to the control surfaces and exposed to substantially the same flutter and vibration. This flutter and vibration due, at least in part, to the variations of speed and atmospheric conditions, is irregular and has an undesirable reaction on the valve assembly and particularly on the valve 36 thereof and therefore a damper is required to counteract and quench any flutter or vibration by the valve 36 in either direction.

To this end fluid from the return 18 is fed to opposite sides of the piston 45 through the companion ducts 21 and 22 respectively opening into the chambers 45' and 45'' on opposite sides of the piston 45. Between the sloping conduit 24 which communicates with the return 18 and the ducts 21 and 22, the cavities 19 and 20 are interposed and each houses a metering device to regulate the fluid flow to and from the sloping conduit 24 and the ducts 21 and 22. These metering devices are identical. Each consists of a plug 55 sealingly threaded into the outer end of a cavity 19 or 20 and extending into the cavity beyond the sloping conduit, a washer 56, a spring 57 and a rectangular plate 58. The washer 56 rests on the shoulder 23 at the intersection of the cavity and its connecting duct 21 or 22 to retain and support one end of the spring 57 located in the cavity below the inner end of the plug 55. The rectangular plate 58 is provided with a recess 58' at each of its corners for the reception therein of the opposite end of the spring 57 and is thereby normally forced into flush contact with inner end of the plug 55. This plate 58 is further characterized by a small metering orifice 58'' through its center.

The plug 55 is provided with a relatively wide peripheral groove 59 and at this point is pierced by a pair of coplanar holes 60 which intersect. This groove 59 insures at least partial communication of the holes 60 with the sloping conduit 24 connecting with the fluid return 18. The lower end of the shank of the plug 55, from the intersecting holes 60 downward, is hollow axially, as at 44, for the passage of the fluid from holes 60 to the end of the shank and then to the plate 58. Normally, when the fluid flow is toward the plate 58 through the passage 44 of the plug 55, it will move the rectangular plate 58 downwardly against the action of the spring 57 and away from the inner end of the plug. When this occurs the fluid within the hollow shank of the plug 55 is free to flow around the edges of the rectangular plate 58 through the ring or washer 56 into the connected duct 21 or 22, which feeds into one of the chambers 45' and 45'' on either side of the piston 45.

When, however, flutter or vibration tends to develop in the valve 36, the piston 45 must correspondingly move and this movement is cushioned or counteracted by the fluid in the chambers 45' and 45''. As the piston 45 reciprocates or tends to reciprocate the fluid in the chambers 45' and 45'' is alternately compressed and relieved. Each of the rectangular plates 58 of the metering devices is forced flush against the face of its plug 55 whenever the piston 45 compresses the body of fluid in the connected chamber 45' or 45'' and thereby eliminates all possible fluid flow around the edges of said plate.

In short as the piston 45 reciprocates by reason of flutter or vibration its movement is cushioned and restricted by the bodies of fluid in the chambers 45' and 45'' on opposite sides thereof. As above noted, these bodies of fluid are alternately compressed and relieved by this action of the piston. Assuming that the fluid in chamber 45' is being compressed by the piston 45 while that in chamber 45'' is being relieved, the fluid in chamber 45' is being forced therefrom through the connected duct 21 into the bottom part of the cavity 19 where it seats the plate 58 flush against the inner end of the plug 55 and thereby cuts off all possible communication around the edges of said plate and at the same time the fluid from the chamber 45' is slowly metered through the metering orifice 58'' into the passage 44 of the plug: during this operation, the relief of the pressure on the fluid in chamber 45'' permits the fluid within the plug 55 in the cavity 20 to force the plate 58 of that unit away from the inner end of the plug and against the action of the spring 57, thereby permitting fluid from the passage 44 of the plug to flow not only through the metering orifice 58'' of the plate but around the edges of the plate into and through the duct 20 to the chamber 45'' increasing the quantity of fluid in that chamber. The foregoing action occurs as the piston 45 moves in the direction to compress the fluid in chamber 45' and when its movement is reversed to compress the fluid in chamber 45'' this action is also reversed so that additional fluid is then fed into chamber 45' while fluid is being slowly metered from chamber 45''.

At times the normal operation of the instant device may be impossible or perhaps undesirable, e. g. when an emergency arises where it is necessary to eliminate the operation of the power unit or jack controlled by the present valve assembly in the adjustment of the control surfaces of an aircraft, and to carry out this adjustment manually. If the valve assembly 10 and the associated power unit then remains in the system the direct and manual adjustment of the control surfaces would be opposed by all of the hydraulic fluid in the entire system and this obviously would greatly handicap manual adjustment. It is in anticipation of emergencies or the direct manual adjustment of the control surfaces that the present valve assembly is designed for operation only when fluid under pressure is being delivered to the supply or inlet port 17 and for that purpose the valve assembly includes a by-pass whereby fluid may be automatically diverted from its normal route through the above described mechanism to circulate ineffectively through the valve assembly 10 from one end to the other of the cylinder of the power unit or jack if and when fluid flow to the inlet port 17 is interrupted. Of course, under such conditions the pilot would revert to the direct manual adjustment of the control surfaces, or may employ some additional auxiliary means if such be provided, in order to regulate or adjust the control surfaces.

For this purpose an automatically adjustable cut-off valve is adapted for operation within the auxiliary bore 14 to arrest communication between the ports 13' and 13" during normal operation and to establish such communication if and when fluid flow to the supply port 17 ceases. This valve comprises a tubular bushing 62 designed for snug engagement within the bore 14, a hollow retaining plug 63 threaded into the end of the bore 14 to abut the outer extremity of the bushing 62 and a spring loaded piston 65 capable of reciprocation within the bushing 62. The bushing 62 is pierced transversely between its ends by a hole or aperture 64 which when it registers with the ports 13' and 13" permits unobstructed passage between these ports. The inner extremity of the bushing 62 is provided with a peripheral, external groove 66 to be always in communication with one end of the sloping duct 27, which in turn is always in communication with the chamber 39 of the valve 36. One or more transverse holes 57 are provided in the bottom of the groove 66 to establish communication between the duct 27 and the interior of the bushing 62.

The piston 65, when fluid under pressure is not being delivered to the inlet or supply port 17 is positioned by the spring 68 with its outer face in abutment with the inner end of the plug 63. This spring 68 is seated or housed in a deep, coaxial recess 70 provided therefor in the body of the piston 65 and projects from the piston to contact the wall of the auxiliary bore 14, in which a complemental retaining recess 69 is provided. This spring 68 when free to operate constantly tends to seat the outer face of the piston on the inner face of the plug 63 as aforesaid. The portion of the piston 65 adjacent the transverse hole 64 in the bushing 62 when the piston occupies this position is reduced in diameter to provide a relatively thin neck 71 more or less centrally of the length of the piston. Hence, the by-pass bore 13 is unobstructed when the piston 65 is seated on the inner end of the plug 63 so that the hydraulic fluid may freely pass through the by-pass bore 13 from one end of the associated cylinder to the other and vice versa since the ports 13' and 13" are then directly connected by the transverse hole 64 in the bushing.

However, the hydraulic fluid feedline from the source of fluid under pressure and attached to the inlet port 17 is tapped by a branch line E at some point exteriorly of the inlet port 17 which leads to and connects with the passage through the plug 63. Therefore, fluid under substantially the same or somewhat greater pressure as the fluid delivered to the inlet port 17 is simultaneously delivered to the outer end of the bushing 62 and against the outer face of the piston 65. Manifestly, the fluid under pressure delivered against the outer face of the piston 65 will overcome the spring 68 and force the piston 65 inwardly of the bushing 62 until its movement is arrested by contact between its inner end and the aligned portion of the wall of the main bore 12 when the piston will occupy a position where it obstructs or blocks the bore 13 thereby disconnecting the ports 13' and 13". When this happens the components of the cut-off valve are in their normal operating positions but when the spring 68 is permitted to return the piston 65 to its outer limit of movement by the removal of the fluid pressure from its outer face, the ports 13' and 13" are connected as above described and the hydraulic fluid is free to flow merely from one end of the cylinder of the power unit to the other and is not required to flow through the entire system as would otherwise be necessary.

Once fluid has been admitted to and through the assembly 10 and therefore has automatically raised the piston 65 to its normal operative position where it separates or partitions the ports 13' and 13", any interruption of the supply of fluid under pressure removes the pressure from against the outer face of the piston 65 and permits the spring 68 to seat the piston on the inner face of the plug 63. Under these circumstances the head of fluid in the pipe E leading to the passage in the plug 63 may retard or prevent the operation of the spring 68. This condition is forestalled or obviated by the sloping duct 27 which delivers a portion of the fluid in the return side or line of the system to the interior of the bushing 62 where its acts on the inner end of the piston 65 and equalizes the pressure on both ends thereof so that the spring 68 can move said piston outwardly in the bushing to permit the unobstructed flow of fluid between the ports 13' and 13".

What is claimed is:

1. A fluid control valve assembly comprising the combination with a casing having a bore, a main fluid inlet communicating with the bore medially of its length, an auxiliary fluid inlet in approximate opposition to the main fluid inlet; operating ports connecting with and aligned transversely of the auxiliary fluid inlet, said operating ports independently connecting with the bore adjoining its ends, and a fluid return connected to one end of the main bore, of a valve mounted for reciprocation within the bore, said valve being provided with a closure to cooperate with each of the operating ports and close its associated port when said valve is in neutral position, said closures together defining a central valve chamber constantly in communication with the main fluid inlet and operating valve chambers on opposite sides of said central chamber one whereof always communicates with the fluid return, and said valve also having an internal passage connected at its ends to said operating chambers, means for moving the valve in either direction within the bore whereby the central chamber of the valve may be placed in communication with one of the operating ports and the operating chamber always communicating with the fluid return may be placed in communication with the other operating port upon the movement of the valve in one direction and upon the movement of the valve in the opposite direction the central chamber thereof may be placed in communication with the other operating port while the first operating port originally connected to the central chamber of the valve may be placed in communication with the operating chamber of the valve situate at the opposite end thereof to the operating chamber in constant communication with the fluid return to thereby establish communication with the latter through the internal passage of the valve, and a cut-off valve associated with the auxiliary fluid inlet and said operating ports operable upon the simultaneous admission of fluid under pressure to the main and auxiliary inlets to block direct communication between the operating ports.

2. A fluid control valve assembly comprising the combination with a casing having a bore, a main fluid inlet communicating with the bore medially of its length, an auxiliary fluid inlet in approximate opposition to the main fluid inlet, operating ports connecting with and aligned transversely of the auxiliary fluid inlet, said operating ports independently connecting with the bore adjoining its ends, and a fluid return connected to one end of the main bore, of a valve mounted for reciprocation within the bore, provided with a closure to cooperate with each of the operating ports and close its associated port when said valve is in neutral position, said closures defining a central valve chamber constantly in communication with the main fluid inlet and terminal valve chambers, one whereof always communicates with the fluid return and said valve, also having an internal longitudinal passage connected at its ends to said terminal chambers, means for moving the valve in either direction within the bore whereby the central chamber of the valve may be placed in communication with one of the operating ports and the terminal chamber communicating with the fluid return may be placed in communication with the other operating port upon the movement of the valve in one direction and upon the movement of the valve in the opposite direction the central chamber thereof may be placed in communication with the other operating port while the first operating port may be placed in communication with the terminal chamber of the valve at the opposite end thereof to the terminal chamber in constant communication with the fluid return thereby establishing communication with the latter through the internal passage of the valve, a cut-off valve associated with the auxiliary fluid inlet and said operating ports operable upon the simultaneous delivery of fluid under pressure to both the main and auxiliary inlets to block communication through the auxiliary inlet between said operating ports, and means operable upon a reduction of fluid pressure at the auxiliary inlet to reversely adjust said cut-off valve to permit direct communication between the operating ports.

3. In a fluid control valve assembly the combination with a casing having a bore, a fluid inlet communicating with said bore centrally of its length, a pair of operating ports, a fluid return outlet communicating with one end of said bore and an independent passage connecting each of said ports to the bore adjacent to the ends thereof and in opposition to said inlet, of a valve mounted for reciprocation within the bore and formed to embody a pair of spaced closures, a central chamber between said closures and a terminal chamber adjoining each closure, said central chamber being always in communication with the fluid inlet and each of the terminal chambers being for association with one of said passages and one thereof being in constant communication with the fluid return outlet aforesaid, the closures when the valve is in its neutral position sealing and closing both of the passages aforesaid, means whereby the valve may be reciprocated within the bore in either direction to thereby connect the central chamber of the valve with either of the aforesaid passages and simultaneously connect one of the terminal chambers aforesaid to the other of said passages, means of communication between the terminal chambers of the valve consisting of a longitudinal internal conduit within the valve terminating at its ends in transverse alignment with said terminal chambers and means whereby said conduit connects at its ends with each of said terminal chambers, and means for reciprocating said valve within the bore to connect either one of said passages with the central chamber and simultaneously connect the other of said passages with its associated terminal chamber.

4. In a fluid control valve assembly the combination with a casing having a bore, a fluid inlet communicating with said bore centrally of its length, a pair of operating ports, a fluid return outlet communicating with one end of said bore and an independent passage connecting each of said ports to the bore adjacent to the ends thereof and in opposition to said inlet, of a valve mounted in the bore and formed to embody a pair of spaced closures, a central chamber between said closures and a terminal chamber adjoining each closure, said central chamber being always in communication with the fluid inlet and each of the terminal chambers being associated with one of said passages with one thereof in constant communication with the fluid return outlet aforesaid, the closures when the valve is in its neutral position sealing and closing both of the passages aforesaid, means for operating the valve to connect one or the other of said passages to the central chamber of the valve and the remaining passage to its associated terminal chamber, and means whereby independent and constant communication is maintained between said terminal chambers.

5. In a fluid control valve assembly the combination with a casing having a bore, a fluid inlet communicating with said bore centrally of its length, a pair of operating ports, a fluid return outlet communicating with one end of said bore and an independent passage connecting each of said ports to the bore adjacent to the ends thereof and in opposition to said inlet, of a valve mounted in the bore and formed to embody a pair of spaced closures, a central chamber between said closures and a terminal chamber adjoining each closure, one of said closures being individual to one of said independent ducts and adapted to seal and close its associated duct when said valve is in neutral position, said central chamber being always in communication with the fluid inlet and each of the terminal chambers being associated with one of said passages with one thereof in constant communication with the fluid return outlet aforesaid, means for operating the valve to connect one or the other of said passages to the central chamber of the valve and the remaining passage to its associated terminal chamber, and means whereby independent and constant communication is maintained between said terminal chambers consisting of a duct within the valve of a length approximating the space between the terminal chambers and in communication with one of said chambers at each of its ends.

6. In a fluid control valve assembly the combination with a casing having a bore, a fluid inlet communicating with said bore centrally of its length, a pair of opposed and aligned operating ports separated by a passage in the casing normal to the bore, a fluid return outlet communicating with one end of said bore and an independent duct connecting each of said ports to the bore adjacent to the ends thereof and in opposition to said inlet, of a valve mounted for reciprocation within the bore and formed to embody a pair of spaced closures, a central chamber between said closures and a terminal chamber adjoining each closure on the side thereof opposite to the central chamber, one of said closures being individual to one of said independent ducts and adapted to seal and close its associated duct when said valve is in neutral position, said central chamber being in constant communication with the fluid inlet and each of the terminal chambers being in constant communication with each other and respectively associated with one of said independent ducts and one thereof being in constant communication with the fluid return outlet whereby the reciprocation of the valve within the bore connects one or the other of said ducts with the central chamber and simultaneously connects the remaining duct with its associated terminal chamber so that one operating port receives fluid from the inlet and the fluid entering the other operating port discharges into its associated terminal chamber and through the fluid return, an auxiliary valve mounted within the passage between the ports and pierced by a transverse orifice, means interposed between the casing and the auxiliary valve to position the valve with its orifice in alignment with both of the operating ports, and means for delivering fluid under pressure to act on said auxiliary valve and move it to a position in the passage where its orifice is out of alignment with the operating ports.

MANUEL UNTERMAN.

References Cited in the file of this patent

UNITED STATES PATENTS

| Number | Name | Date |
| --- | --- | --- |
| 2,283,541 | Dodson | May 19, 1939 |
| 2,366,382 | Burton | Mar. 28, 1939 |
| 2,403,519 | Gardiner | July 9, 1946 |